(12) United States Patent
Funada

(10) Patent No.: US 10,668,715 B2
(45) Date of Patent: Jun. 2, 2020

(54) OFFSET PRINTING PRESS FOR PRINTING SECURITIES HAVING QUALITY INSPECTION CAMERA

(75) Inventor: Hitoshi Funada, Tokyo (JP)

(73) Assignee: KOMORI CORPORATION, Tokyo (JP)

( * ) Notice: Subject to any disclaimer, the term of this patent is extended or adjusted under 35 U.S.C. 154(b) by 319 days.

(21) Appl. No.: 13/363,264

(22) Filed: Jan. 31, 2012

(65) Prior Publication Data

US 2012/0199025 A1  Aug. 9, 2012

(30) Foreign Application Priority Data

Feb. 4, 2011  (JP) ................................ 2011-022694

(51) Int. Cl.
| | |
|---|---|
| B41F 23/04 | (2006.01) |
| B41F 33/00 | (2006.01) |
| B41F 13/40 | (2006.01) |
| B41F 7/02 | (2006.01) |
| B41F 33/06 | (2006.01) |
| B41F 13/36 | (2006.01) |
| B41F 33/02 | (2006.01) |
| B41F 33/14 | (2006.01) |

(Continued)

(52) U.S. Cl.
CPC .............. *B41F 33/00* (2013.01); *B41F 7/025* (2013.01); *B41F 7/06* (2013.01); *B41F 7/12* (2013.01); *B41F 13/36* (2013.01); *B41F 13/40* (2013.01); *B41F 21/08* (2013.01); *B41F 33/0009* (2013.01); *B41F 33/0036* (2013.01); *B41F 33/025* (2013.01); *B41F 33/06* (2013.01); *B41F 33/14* (2013.01); *G01N 21/86* (2013.01)

(58) Field of Classification Search
CPC .. B41F 33/00; B41F 33/0027; B41F 33/0036; B41F 33/14; B41F 21/00; B41F 21/10; G01N 21/86
USPC .................. 101/484, 416, 217; 382/100, 135
See application file for complete search history.

(56) References Cited

U.S. PATENT DOCUMENTS 5,142,979 A * 9/1992 Funada et al. ................. 101/183
5,311,817 A * 5/1994 Funada .......................... 101/177
(Continued)

FOREIGN PATENT DOCUMENTS

| CN | 1898704 A | 1/2007 |
|---|---|---|
| CN | 101269569 A | 9/2008 |

(Continued)

OTHER PUBLICATIONS

Machine Translation of Ono (JP01125229), Published May 17, 1989.*

(Continued)

*Primary Examiner* — Jennifer E Simmons
*Assistant Examiner* — Quang X Nguyen
(74) *Attorney, Agent, or Firm* — Womble Bond Dickinson (US) LLP

(57) ABSTRACT

This invention discloses an offset printing press for printing securities, which includes an offset printing unit, inspection camera unit, and sheet quality determination unit. The offset printing unit prints a ground tint pattern on a transported paper sheet. The inspection camera unit is arranged upstream of the offset printing unit in the direction in which the paper sheet is transported, and captures an image of the paper sheet. The sheet quality determination unit determines the quality of the paper sheet based on image data output from the inspection camera unit.

10 Claims, 8 Drawing Sheets

(51) Int. Cl.
*G01N 21/86* (2006.01)
*B41F 7/06* (2006.01)
*B41F 7/12* (2006.01)
*B41F 21/08* (2006.01)

(56) References Cited

U.S. PATENT DOCUMENTS

| | | | |
|---|---|---|---|
| 6,241,243 B1 * | 6/2001 | Ishida et al. | 271/258.01 |
| 6,338,299 B1 * | 1/2002 | Kamoda et al. | 101/424.1 |
| 6,595,130 B2 * | 7/2003 | Uehara | 101/216 |
| 6,883,429 B2 * | 4/2005 | Kamoda | 101/480 |
| 7,569,825 B2 * | 8/2009 | Kamijo | 250/360.1 |
| 2003/0122914 A1 * | 7/2003 | Kusaka | 347/104 |
| 2005/0078851 A1 | 4/2005 | Jones et al. | |
| 2006/0208412 A1 * | 9/2006 | Reinhard et al. | 271/10.01 |
| 2007/0003341 A1 * | 1/2007 | Guan | G03G 21/043 399/366 |
| 2007/0012207 A1 * | 1/2007 | Takenouchi et al. | 101/335 |
| 2007/0062402 A1 * | 3/2007 | Ryan et al. | 101/484 |
| 2008/0229949 A1 * | 9/2008 | Saito et al. | 101/363 |
| 2008/0259314 A1 | 10/2008 | Kamijo | |
| 2010/0237560 A1 | 9/2010 | Kamoda | |
| 2010/0252747 A1 | 10/2010 | Nakano et al. | |
| 2013/0276656 A1 | 10/2013 | Saito et al. | |

FOREIGN PATENT DOCUMENTS

| | | |
|---|---|---|
| CN | 101850652 A | 10/2010 |
| CN | 101858865 A | 10/2010 |
| EP | 0 916 602 A1 | 5/1999 |
| EP | 1 197 332 A1 | 4/2002 |
| EP | 1 818 177 A2 | 2/2007 |
| EP | 2 239 711 A1 | 10/2010 |
| GB | 2 094 718 A | 3/1982 |
| JP | 57-163571 | 3/1982 |
| JP | 01125229 A * | 5/1989 |
| JP | 01-316268 | 12/1989 |
| JP | 05-008582 | 1/1993 |
| JP | 2000-085095 | 3/2000 |
| JP | 2002-120348 A | 4/2002 |
| JP | 2004-034641 A | 2/2004 |
| JP | 2007/152840 | 6/2007 |
| JP | 2007-523761 A | 8/2007 |
| JP | 2007-251400 A * | 9/2007 |
| JP | 2008-307717 | 12/2008 |
| JP | 4347729 B2 | 7/2009 |
| JP | 2010-221410 A | 10/2010 |
| WO | WO 2005/008606 A1 | 1/2005 |
| WO | WO 2005/078670 A1 | 8/2005 |

OTHER PUBLICATIONS

Helmut Kipphan (Ed.). "Handbook of Print Media Technologies and Production Methods." Germany (2001). pp. 423-429.

Communication in European Patent Application No. 12000211.8 dated Apr. 20, 2017. 4 pages.

Komori Corporation, "Summons to attend oral proceedings," EP Application No. 12000211.8 (Dec. 17, 2019).

* cited by examiner

OFFSET PRINTING PRESS FOR PRINTING SECURITIES HAVING QUALITY INSPECTION CAMERA

BACKGROUND OF THE INVENTION

The present invention relates to an offset printing press for printing securities, which prints on securities such as bank notes.

Japanese Patent Laid-Open No. 2010-221410 discloses an offset printing press for printing securities of this type. This printing press includes a sheet feed device, printing device, sheet delivery device, and inspection device. The sheet feed device feeds paper sheets one by one. The printing device prints on the paper sheets fed from the sheet feed device. The sheet delivery device uses delivery chains to transport and deliver the paper sheets printed by the printing device to a delivery pile. The inspection device inspects print images printed on the paper sheets before they are delivered to the delivery pile. Paper sheets printed by a printing press of this type are processed by anticounterfeit techniques such as embedding of a "watermark".

In the above-mentioned printing press, to inspect the qualities of paper sheets themselves, the operator carries all paper sheets printed and delivered to the delivery pile from the printing press to a room for inspection, and inspects them by visual inspection or using an inspection device in the inspection room. Therefore, the quality determination criterion in inspection is not stable, a special operator dedicated to inspection is necessary, the operator's burden is heavy, and the productivity lowers. Also, in this inspection method, the qualities of paper sheets are inspected while print images are superimposed on materials embedded in the paper sheets by anticounterfeit techniques. Thus, the print images become a factor which hinders inspection of the qualities of the paper sheets, so the inspection accuracy may degrade.

SUMMARY OF THE INVENTION

It is an object of the present invention to relieve the operator's burden, improve the productivity, and improve the accuracy of sheet quality inspection.

In order to achieve the above-mentioned object, according to the present invention, there is provided an offset printing press for printing securities, comprising an offset printing unit which prints a ground tint pattern on a transported paper sheet, an inspection camera unit which is arranged upstream of the offset printing unit in a direction in which the paper sheet is transported, and captures an image of the paper sheet, and a sheet quality determination unit which determines a quality of the paper sheet based on image data output from the inspection camera unit.

DESCRIPTION OF THE PREFERRED EMBODIMENTS

Figure 1:
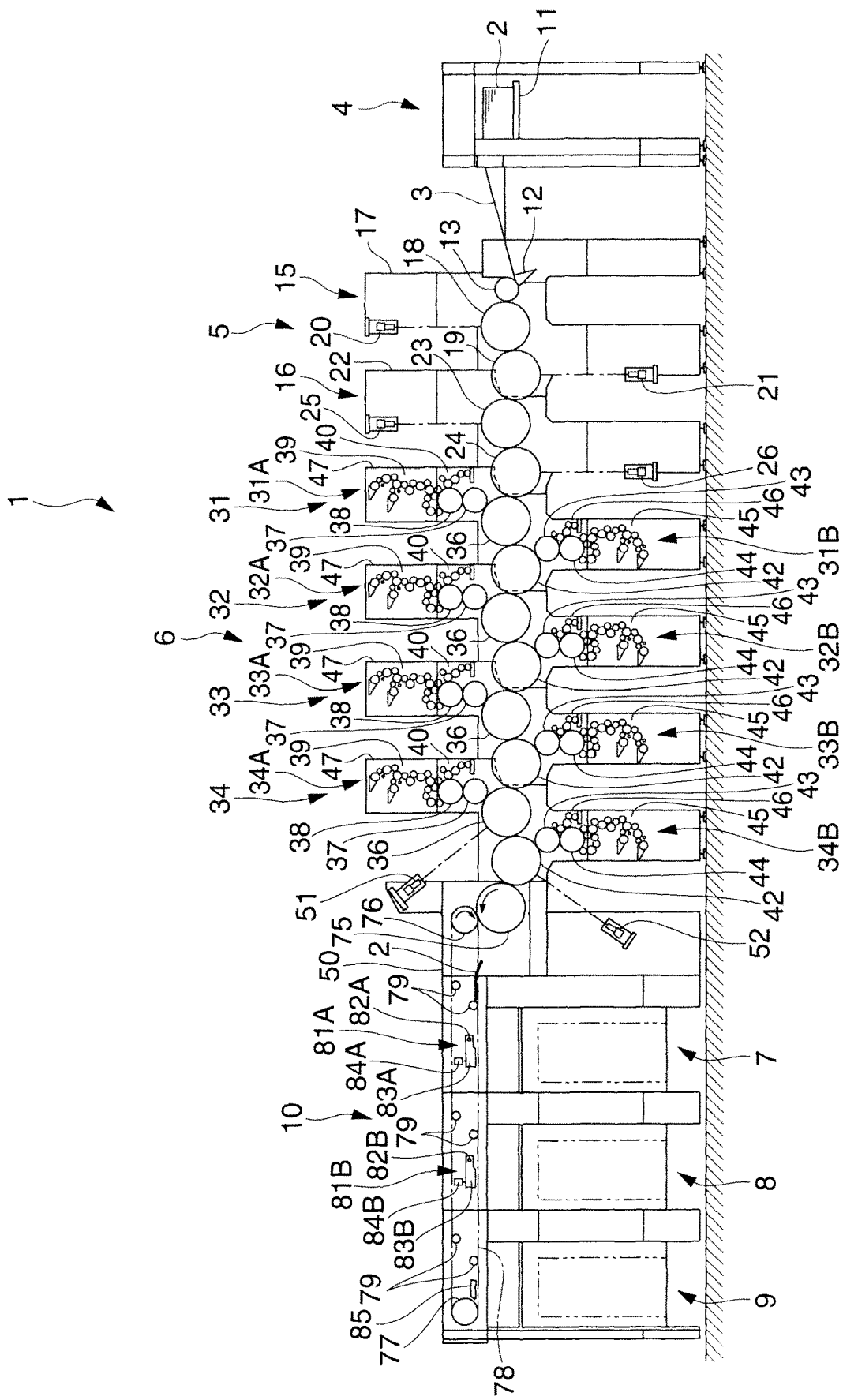
FIG. 1 is a side view showing an offset printing press for printing securities according to the first embodiment of the present invention.

Embodiments of the present invention will be described below with reference to FIGS. 1 to 9.

First Embodiment

The first embodiment of the present invention will be described with reference to FIGS. 1 to 5. An offset printing press 1 for printing securities shown in FIG. 1 includes a sheet feed device 4, sheet quality inspection unit 5, offset printing unit 6, and sheet delivery device 10. The sheet feed device 4 serves as a sheet supply device which feeds paper sheets 2 to a feeder board 3 one by one. The sheet quality inspection unit 5 is used to inspect the qualities of the paper sheets 2 fed from the sheet feed device 4. The offset printing unit 6 is positioned downstream of the sheet quality inspection unit 5 in the direction in which the paper sheet 2 is transported, and prints print images of ground tint patterns on the paper sheets 2. The sheet delivery device 10 transports the paper sheets 2 having the print images printed on them by the offset printing unit 6, and delivers them to first and second normal sheet piles 7 and 8 or an abnormal sheet pile 9.

The sheet feed device 4 is provided with a pile board 11 which stacks a large number of paper sheets 2. The paper sheets 2 stacked on the pile board 11 are drawn by suction one by one by a suction device (not shown), are fed to the feeder board 3, and are further fed to the sheet quality inspection unit 5 via a transfer cylinder 13 by a swing arm shaft pregripper 12 after their leading edges are aligned. The obverse and reverse surfaces of the paper sheets 2 stacked on the pile board 11 are processed by some or all of anticounterfeit techniques such as embedding of a so-called "watermark", "hologram", "security wire", "pearl print", and "security fiber".

The sheet quality inspection unit 5 includes a first inspection unit 15, and a second inspection unit 16 provided downstream of the first inspection unit 15 in the direction in which the paper sheet 2 is transported. The first inspection unit 15 includes a pair of inspection frames 17, the transfer cylinder 13, transport cylinders 18 and 19, a first obverse surface inspection camera 20, and a first reverse surface inspection camera 21. The pair of inspection frames 17 are formed in a crank shape when viewed in a side view. The transfer cylinder 13 is rotatably supported between the pair of inspection frames 17. The transport cylinder 18 is opposed to the transfer cylinder 13. The transport cylinder 19 is opposed to the transport cylinder 18. The first obverse surface inspection camera 20 serves as a first inspection camera and captures an image of the obverse surface of the paper sheet 2. The first reverse surface inspection camera 21 serves as the first inspection camera and captures an image of the reverse surface of the paper sheet 2. The transfer cylinder 13, transport cylinders 18 and 19, and cameras 20 and 21 are mounted in the inspection frames 17 and modularized into a single unit. Note that since the pair of inspection frames 17 are aligned with each other in the direction going into the paper surface of FIG. 1, one inspection frame 17 is not shown in FIG. 1.

Figure 5:
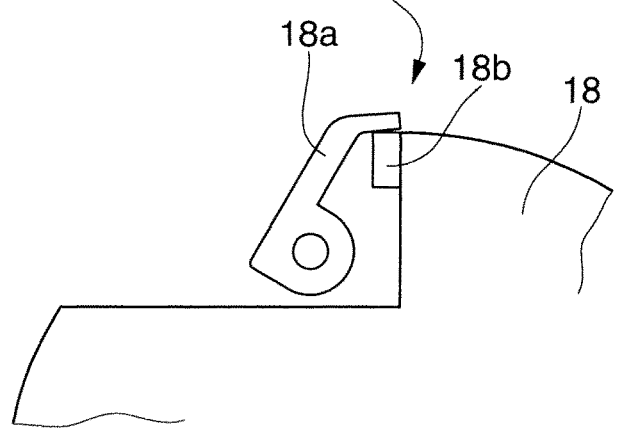
FIG. 5 is an enlarged side view showing a gripper device provided on a cylinder in the printing press shown in FIG. 1.

A gripper device 18c which serves as a sheet holding device and includes a gripper 18a and gripper pad 18b, as shown in FIG. 5, is provided in the notch of the transport cylinder 18, and the first obverse surface inspection camera 20 captures an image of the obverse surface of the paper sheet 2 held and transported by the gripper device 18c. Similarly, a gripper device 19c which serves as a sheet holding device and has the same arrangement as the gripper device 18c is provided in the notch of the transport cylinder 19, and the first reverse surface inspection camera 21 captures an image of the reverse surface of the paper sheet 2 held and transported by the gripper device 19c.

Each of the first obverse surface inspection camera 20 and first reverse surface inspection camera 21 uses an infrared absorption image and color image inspection camera which captures an infrared absorption image and color image formed on the paper sheet 2. The inspection cameras 20 and 21 are used to capture images of the "watermark", "hologram", "pearl print", and "security wire" embedded in the paper sheet 2.

The transport cylinders 18 and 19 have arrangements which bring the paper sheet 2 held and transported by the gripper devices 18c and 19c, respectively, into tight contact with their circumferential surfaces. An arrangement in which a large number of suction holes are provided in the circumferential surface of a transport cylinder, as disclosed in Japanese Patent Laid-Open No. 2002-120348, or an arrangement which uses a nozzle to draw the trailing edge (tail edge) of the paper sheet 2 by suction, for example, is applicable to the arrangement of each of the transport cylinders 18 and 19. The transported paper sheet 2 is brought into tight contact with the circumferential surfaces of the transport cylinders 18 and 19, thereby improving the accuracy of quality inspection of the paper sheet 2 by the first obverse surface inspection camera 20 and first reverse surface inspection camera 21.

The second inspection unit 16 includes a pair of inspection frames 22, transport cylinders 23 and 24, a second obverse surface inspection camera 25, and a second reverse surface inspection camera 26. The pair of inspection frames 22 are formed in a crank shape when viewed in a side view. The transport cylinder 23 is rotatably supported between the pair of inspection frames 22, and opposed to the transport cylinder 19. The transport cylinder 24 is opposed to the transport cylinder 23. The second obverse surface inspection camera 25 serves as a second inspection camera and captures an image of the obverse surface of the paper sheet 2. The second reverse surface inspection camera 26 serves as the second inspection camera and captures an image of the reverse surface of the paper sheet 2. The transport cylinders 23 and 24 and cameras 25 and 26 are mounted in the inspection frames 22 and modularized into a single unit. Note that since the pair of inspection frames 22 are aligned with each other in the direction going into the paper surface of FIG. 1, one inspection frame 22 is not shown in FIG. 1.

A gripper device 23c which serves as a sheet holding device and has the same arrangement as the gripper device 18c of the transport cylinder 18 is provided in the notch of the transport cylinder 23, and the second obverse surface inspection camera 25 captures an image of the obverse surface of the paper sheet 2 held and transported by the gripper device 23c. Similarly, a gripper device 24c which serves as a sheet holding device and has the same arrangement as the gripper device 18c is provided in the notch of the transport cylinder 24, and the second reverse surface inspection camera 26 captures an image of the reverse surface of the paper sheet 2 held and transported by the gripper device 24c.

Each of the second obverse surface inspection camera 25 and second reverse surface inspection camera 26 uses an ultraviolet camera which captures an ultraviolet image formed on the paper sheet 2. This ultraviolet camera is used to capture an image of the "security fiber" embedded in the paper sheet 2.

The transport cylinders 23 and 24 are formed similarly to the transport cylinders 18 and 19, respectively. Hence, the paper sheet 2 held and transported by the gripper devices 23c and 24c of the transport cylinders 23 and 24, respectively, is brought into tight contact with their circumferential surfaces, thereby improving the accuracy of quality inspection of the paper sheet 2 by the second obverse surface inspection camera 25 and second reverse surface inspection camera 26.

In this manner, because inspection units such as the first inspection unit 15 and second inspection unit 16 are modularized into single units, inspection units need only be arranged in numbers corresponding to those of obverse surface inspection cameras and reverse surface inspection cameras. This makes it possible to form an optimum sheet quality inspection unit 5 compatible with the inspection items.

The offset printing unit 6 includes four, first to fourth printing units 31 to 34. The printing units 31 to 34 include obverse side printing units 31A to 34A and reverse side printing units 31B to 34B, respectively. The obverse side printing units 31A to 34A serve as one-side printing units which print on the obverse surface (one surface) of the paper sheet 2. The reverse side printing units 31B to 34B serve as other-side printing units which print on the reverse surface (other surface) of the paper sheet 2. Since the printing units 31 to 34 have the same structure, only the printing unit 31 will be described in detail hereinafter, and the remaining printing units 32 to 34 will be described as needed.

The obverse side printing unit 31A of the printing unit 31 includes a first impression cylinder 36, first blanket cylinder 37, first plate cylinder 38, double duct ink supply device 39, and dampening device 40. The first impression cylinder 36 is opposed to the transport cylinder 24. The first blanket cylinder 37 is in contact with the first impression cylinder 36. The first plate cylinder 38 is in contact with the first blanket cylinder 37, and transfers ink onto the first blanket cylinder 37. The ink supply device 39 includes two ink fountains and a large number of rollers, which serve to supply ink onto the first plate cylinder 38. The dampening device 40 supplies dampening water onto the first plate cylinder 38. A gripper device 36c which serves as a sheet holding device and has the same arrangement as the gripper device 18c of the transport cylinder 18 is provided in the notch of the first impression cylinder 36, and the gripper device 36c holds and transports the paper sheet 2 transferred from the gripper device 24c of the transport cylinder 24.

The reverse side printing unit 31B of the printing unit 31 includes a second impression cylinder 42, second blanket cylinder 43, second plate cylinder 44, double duct ink supply device 45, and dampening device 46. The second impression cylinder 42 is in contact with the first impression cylinder 36. The second blanket cylinder 43 is in contact with the second impression cylinder 42. The second plate cylinder 44 is in contact with the second blanket cylinder 43, and transfers ink onto the second blanket cylinder 43. The ink supply device 45 includes two ink fountains and a large number of rollers, which serve to supply ink onto the second plate cylinder 44. The dampening device 46 supplies dampening water onto the second plate cylinder 44. A gripper device 42c which serves as a sheet holding device and has the same arrangement as the gripper device 18c of the transport cylinder 18 is provided in the notch of the second impression cylinder 42, and the gripper device 42c holds and transports the paper sheet 2 transferred from the gripper device 36c of the first impression cylinder 36.

The printing unit 31 includes a pair of printing frames 47 formed in a crank shape when viewed in a side view. Note that since the pair of printing frames 47 are aligned with each other in the direction going into the paper surface of FIG. 1, one printing frame 47 is not shown in FIG. 1. The first and second impression cylinders 36 and 42, first and second blanket cylinders 37 and 43, first and second plate cylinders 38 and 44, ink supply devices 39 and 45, and dampening devices 40 and 46 which constitute the obverse side printing unit 31A and reverse side printing unit 31B are mounted in the pair of printing frames 47, and the printing unit 31 is modularized into a single unit. In this manner, because the printing units 31 to 34 are modularized into single units, optimum numbers of printing units 31 to 34 need only be arranged in accordance with the printing specifications. This makes it possible to form an optimum offset printing unit 6 compatible with the printing specifications.

The sheet delivery device 10 includes a pair of delivery frames 50. Note that since the pair of delivery frames 50 are aligned with each other in the direction going into the paper surface of FIG. 1, one delivery frame 50 is not shown in FIG. 1. A printing quality obverse surface camera 51 and a printing quality reverse surface camera 52 are fixed on the delivery frames 50. The printing quality obverse surface camera 51 is used to inspect the quality of ground tint printing of, for example, an image printed on the obverse surface of the paper sheet 2 by the obverse side printing units 31A to 34A, and captures an image of the obverse surface of the paper sheet 2 having undergone ground tint printing. The printing quality reverse surface camera 52 is used to inspect the quality of ground tint printing of, for example, an image printed on the reverse surface of the paper sheet 2 by the reverse side printing units 31B to 34B, and captures an image of the reverse surface of the paper sheet 2 having undergone ground tint printing.

A transfer cylinder 75 is in contact with the second impression cylinder 42 of the reverse side printing unit 34B of the fourth printing unit 34, and is also in contact with a delivery cylinder 76. A pair of delivery chains 78 are looped around a sprocket (not shown) coaxial with the delivery cylinder 76 and a sprocket 77 provided at the terminal end of the sheet delivery device 10. Note that since the pair of delivery chains 78 are aligned with each other in the direction going into the paper surface of FIG. 1, one delivery chain 78 is not shown in FIG. 1.

A plurality of delivery grippers 79 serving as gripper bars are aligned on gripper shafts mounted between the pair of delivery chains 78 with predetermined spacings between them. The delivery grippers 79 receive the paper sheet 2, gripped by the gripper device of the transfer cylinder 75, in cooperation with the delivery cylinder 76, and transport it to the sheet delivery device 10 as the delivery chains 78 travel.

A first delivery cam moving device 81A is provided above the first normal sheet pile 7. The first delivery cam moving device 81A includes a first delivery cam 83A and air cylinder 84A. The first delivery cam 83A is pivotally supported by the pair of delivery frames 50 to have a shaft 82A as a pivot center. The air cylinder 84A serves as a first delivery cam actuator, and moves the first delivery cam 83A between the extension position to which it extends toward the traveling path of the delivery grippers 79 (the traveling path of the cam follower of the delivery grippers 79), and the retraction position to which it retracts from this traveling path.

In this arrangement, when the air cylinder 84A extends the first delivery cam 83A to the traveling path of the delivery grippers 79, the cam follower (not shown) of the delivery grippers 79 engages with the first delivery cam 83A to release the paper sheet 2 from gripping by the delivery grippers 79, thereby delivering the paper sheet 2 to the first normal sheet pile 7.

On the other hand, when the air cylinder 84A retracts the first delivery cam 83A from the traveling path of the delivery grippers 79, the cam follower (not shown) of the delivery grippers 79 does not engage with the first delivery cam 83A. Therefore, the delivery grippers 79 pass through the portion below the first delivery cam 83A while continuing to grip the paper sheet 2.

A second delivery cam moving device 81B is provided above the second normal sheet pile 8 on the downstream side of the first delivery cam moving device 81A in the direction in which the paper sheet 2 is transported. The second delivery cam moving device 81B includes a second delivery cam 83B and air cylinder 84B. The second delivery cam 83B is pivotally supported by the pair of delivery frames 50 to have a shaft 82B as a pivot center. The air cylinder 84B serves as a second delivery cam actuator, and moves the second delivery cam 83B between the extension position to which it extends toward the traveling path of the delivery grippers 79 (the traveling path of the cam follower of the delivery grippers 79), and the retraction position to which it retracts from this traveling path.

In this arrangement, when the air cylinder 84B extends the second delivery cam 83B to the traveling path of the delivery grippers 79, the cam follower (not shown) of the delivery grippers 79 engages with the second delivery cam 83B to release the paper sheet 2 from gripping by the delivery grippers 79, thereby delivering the paper sheet 2 to the second normal sheet pile 8.

On the other hand, when the air cylinder 84B retracts the second delivery cam 83B from the traveling path of the delivery grippers 79, the cam follower (not shown) of the delivery grippers 79 does not engage with the second delivery cam 83B. Therefore, the delivery grippers 79 pass through the portion below the second delivery cam 83B while continuing to grip the paper sheet 2.

The first delivery cam moving device 81A and second delivery cam moving device 81B constitute a switching device which switches the delivery destination of the paper sheet 2 between the normal sheet piles 7 and 8 and the abnormal sheet pile 9.

A fixing cam 85 is provided above the abnormal sheet pile 9 on the downstream side of the second delivery cam 83B in the direction in which the paper sheet 2 is transported, and faces the traveling path of the delivery grippers 79 (the traveling path of the cam follower of the delivery grippers 79). Therefore, when both the first and second delivery cams 83A and 83B are retracted from the traveling path of the delivery grippers 79, the delivery grippers 79 pass through the portions below the first and second delivery cams 83A and 83B while continuing to grip the paper sheet 2, and the cam follower engages with the fixing cam 85 to release the paper sheet 2 from gripping by the delivery grippers 79, thereby delivering the paper sheet 2 to the abnormal sheet pile 9.

Figure 4:
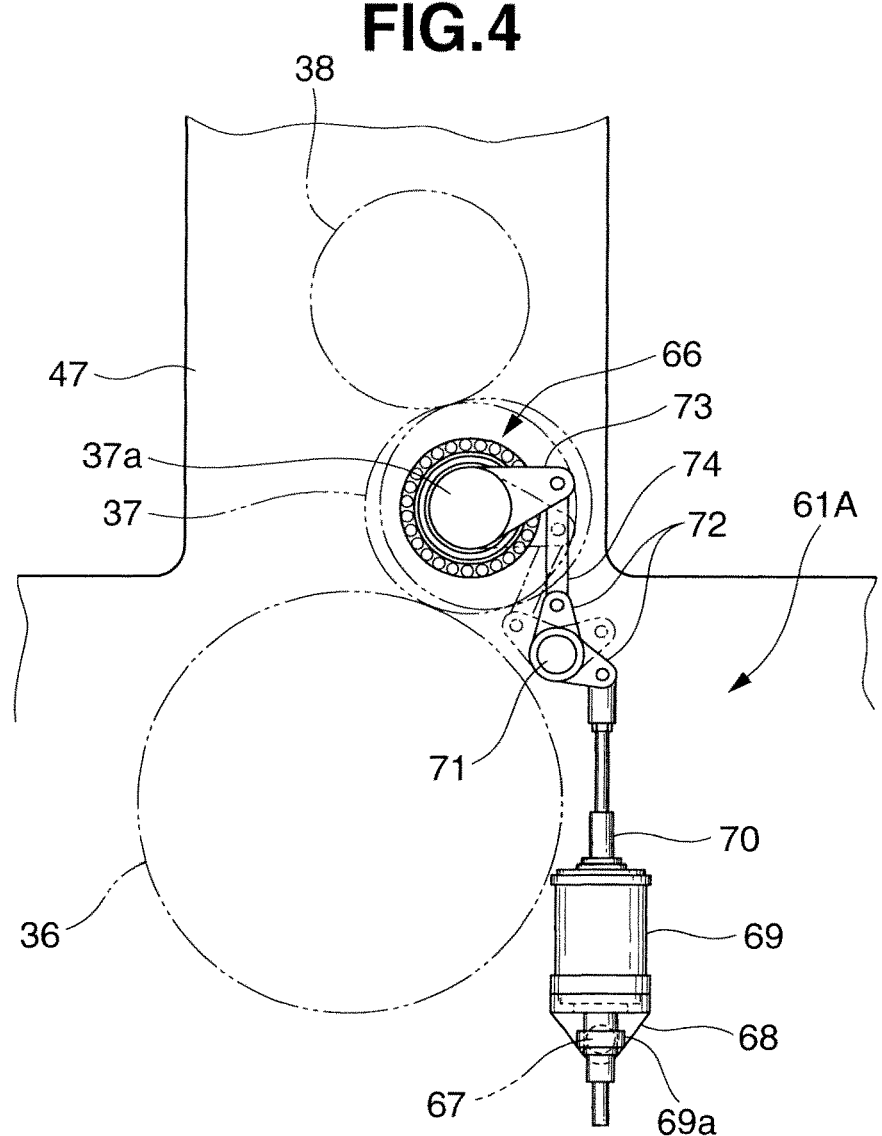
FIG. 4 is a side view showing a cylinder throw-on and throw-off device which throws on and off a blanket cylinder of a printing unit in the printing press shown in FIG. 1.

First to fourth printing unit cylinder throw-on and throw-off devices 61A to 64A and 61B to 64B serving as cylinder throw-on and throw-off devices which throw the first blanket cylinder 37 of the obverse side printing units 31A to 34A of the printing units 31 to 34 on and off the first impression cylinders 36, and throw the blanket cylinders 43 of the reverse side printing units 31B to 34B of the printing units 31 to 34 on and off the second impression cylinders 42 will be described next with reference to FIG. 4.

Since these cylinder throw-on and throw-off devices have the same structure, only the cylinder throw-on and throw-off device 61A which throws on and off the first blanket cylinder 37 of the obverse side printing unit 31A of the first printing unit 31 will be described in detail herein. The cylinder throw-on and throw-off devices 61B, 62A to 64A, and 62B to 64B which throw on and off the second blanket cylinder 43 of the printing unit 31, and the first and second blanket cylinders 37 and 43 of the remaining, second to fourth printing units 32 to 34 will be briefly described as needed.

The two end shafts of the first impression cylinder 36 and first plate cylinder 38 are rotatably, axially supported by the pair of frames 47 via bearings (not shown). Also, two end shafts 37a of the first blanket cylinder 37 are rotatably, axially supported by eccentric bearings 66 fitted in the pair of printing frames 47. A stud 67 projects outwards from one frame 47 in proximity to the end shaft of the first impression cylinder 36. A bracket 68 is supported by the stud 67. A stepping motor 69 serving as a driving device is fixed on the bracket 68 so that a driving rod 70 stands upright.

When the stepping motor 69 rotates a nut 69a, the driving rod 70 having a threaded portion that threadably engages with the nut 69a vertically extends/retracts. A lever shaft 71 is positioned above the driving rod 70, and has its two ends axially supported by the pair of printing frames 47. Connecting levers 72 formed in an L shape when viewed in a front view are axially fixed on the projections of the lever shaft 71.

Each of the eccentric bearings 66 is formed by an outer ring fitted via a needle roller into a housing fitted in the bearing hole of the frame 47, and an inner ring rotatably fitted into the outer ring via a conical roller (neither is shown). The connecting levers 72 and bearing levers 73 fixed on the outer rings of the eccentric bearings 66 as in this case are connected to each other via rods 74, so the driving rod 70 extends/retracts upon driving of the stepping motor 69 so that the eccentric bearings 66 pivot via the connecting levers 72, rods 74, and bearing levers 73.

Shaft cores of the inner peripheral surfaces of the inner rings of the eccentric bearings 66, and those of the outer peripheral surfaces of the outer rings of the eccentric bearings 66 are offset from each other by a predetermined distance. That is, when the driving rod 70 of the stepping motor 69 retracts from the throw-on state of the first blanket cylinder 37, the shaft cores of the inner peripheral surfaces of the inner rings move about those of the outer peripheral surfaces of the outer rings as centers. As a result, a gap is formed between the first blanket cylinder 37 and the first impression cylinder 36 so that the first blanket cylinder 37 is thrown off the first impression cylinder 36. Note that the first blanket cylinder 37 and first plate cylinder 38 continue to have their circumferential surfaces opposed to each other.

Figure 2:
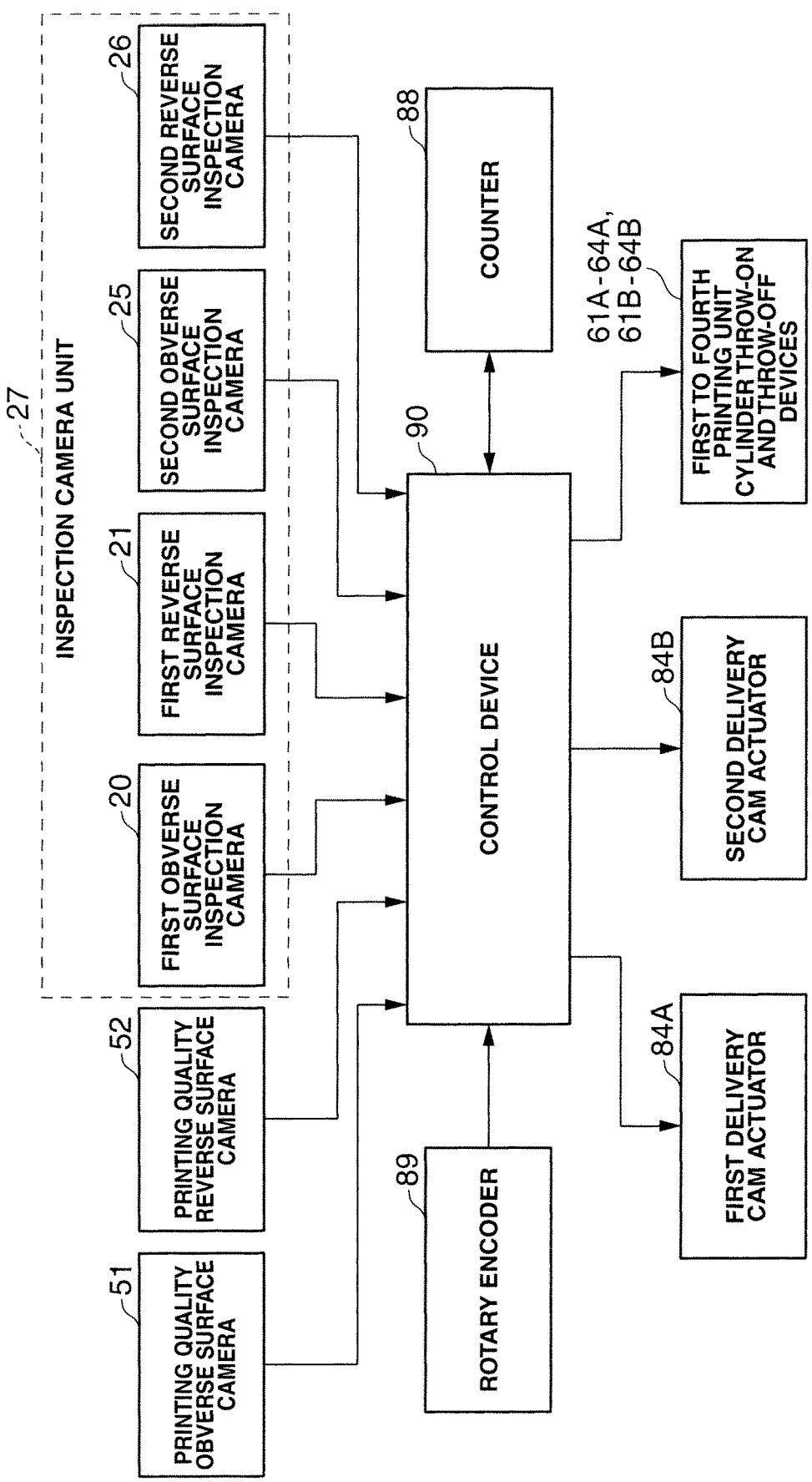
FIG. 2 is a block diagram showing the arrangement of the printing press shown in FIG. 1.

The offset printing press 1 for printing securities also includes a counter 88, rotary encoder 89, and control device 90, as shown in FIG. 2. The counter 88 counts the number of paper sheets 2 fed from the sheet feed device 4 to the sheet quality inspection unit 5. The counter 88 also counts the number of abnormal paper sheets under the control of the control device 90 (to be described later) if the paper sheet 2 is determined to have poor quality based on the quality inspection result of the paper sheet 2 obtained by the sheet quality inspection unit 5. The rotary encoder 89 detects the phase of each cylinder of the printing press 1. The control device 90 uses a computer (CPU or MPU), processes a signal (data) output from each unit of the printing press 1, and controls this unit of the printing press 1 based on the processing result.

Figure 3:
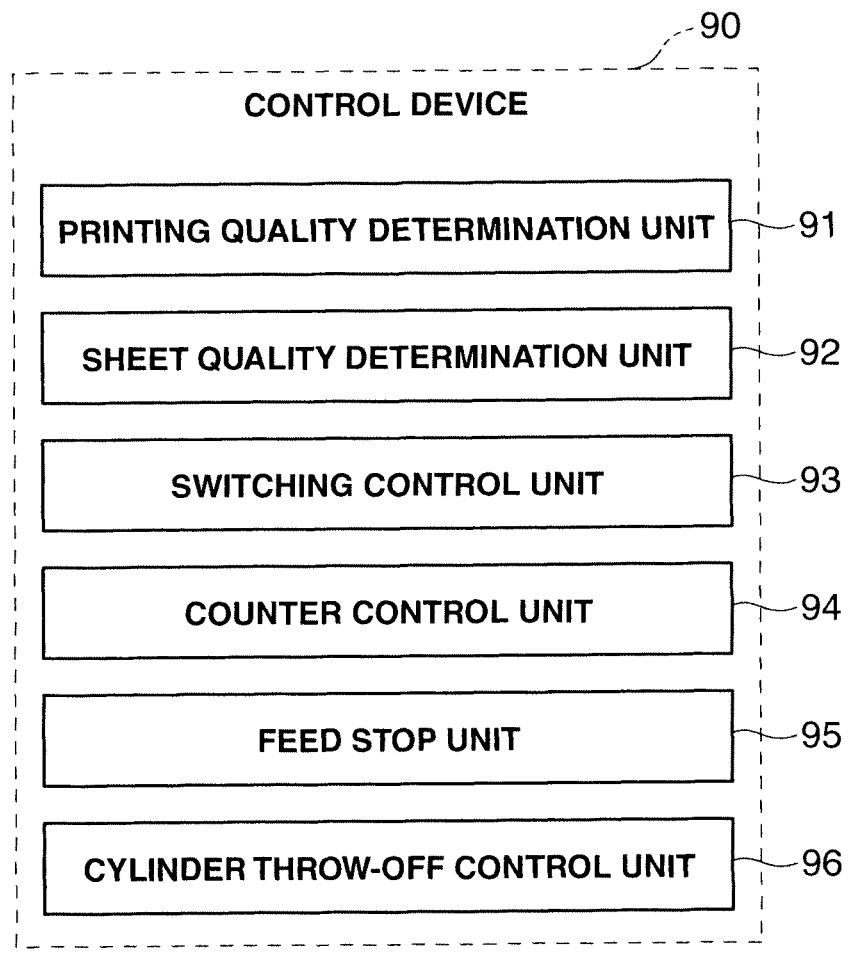
FIG. 3 is a block diagram showing functional units of a control device in FIG. 2.

The control device 90 implements at least functional units 91 to 96, as shown in FIG. 3.

The printing quality determination unit 91 determines the quality of printing on the paper sheet 2, based on image data output from the printing quality obverse surface camera 51 and printing quality reverse surface camera 52. More specifically, the printing quality determination unit 91 inspects the quality of ground tint printing of, for example, an image printed on the obverse surface of the paper sheet 2, based on the output from the printing quality obverse surface camera 51. The printing quality determination unit 91 also inspects the quality of ground tint printing of, for example, an image printed on the reverse surface of the paper sheet 2, based on the output from the printing quality reverse surface camera 52.

The sheet quality determination unit 92 determines the quality of the paper sheet 2 based on image data output from the first obverse surface inspection camera 20 and first reverse surface inspection camera 21 of the first inspection unit 15, and the second obverse surface inspection camera 25 and second reverse surface inspection camera 26 of the second inspection unit 16.

The sheet quality determination unit 92 inspects an infrared absorption image and color image formed on the paper sheet 2, based on the outputs from the first inspection cameras 20 and 21. More specifically, the quality of the "watermark" embedded in the paper sheet 2 is inspected in terms of its position and pattern "streaking". Also, the quality of the "hologram" embedded in the paper sheet 2 is inspected in terms of its bonding position and contour. Moreover, the quality of the "pearl print" is inspected in terms of its pattern position and pattern itself. Again, the quality of the "security wire" is inspected in terms of its bonding position and contour. That is, as for a thread formed by inscribing minute characters in transparent plastic, the paper sheet 2 is inspected for any missing minute characters. On the other hand, as for an open-window thread, the paper sheet 2 is inspected in terms of the position and length of a portion (window) exposed to the surface of the paper sheet 2.

The sheet quality determination unit 92 also inspects an ultraviolet image formed on the paper sheet 2, based on the outputs from the second inspection cameras 25 and 26. More specifically, the quality of the "security fiber" embedded in the paper sheet 2 is inspected in terms of the density and color of a fiber mixed in it.

The switching control unit 93 controls the switching devices (first delivery cam moving device 81A and second delivery cam moving device 81B) to switch the delivery destination of the paper sheet 2. More specifically, the switching control unit 93 controls the switching devices (first delivery cam moving device 81A and second cam moving device 81B) to switch the delivery destination from the first normal sheet pile 7 to the second normal sheet pile 8 when a predetermined number of paper sheets 2 are delivered to the first normal sheet pile 7. The switching control unit 93 also controls the switching devices (first delivery cam moving device 81A and second delivery cam moving device 81B) to switch the delivery destination from the second normal sheet pile 8 to the first normal sheet pile 7 when a predetermined number of paper sheets 2 are delivered to the second normal sheet pile 8. The switching control unit 93 moreover controls the switching devices (first delivery cam moving device 81A and second delivery cam moving device 81B) to deliver, to the abnormal sheet pile 9, a paper sheet 2 determined to have poor printing quality by the printing quality determination unit 91. The switching control unit 93 again controls the switching devices (first delivery cam moving device 81A and second delivery cam moving device 81B) to deliver, to the abnormal sheet pile 9, a paper sheet 2 determined to have poor quality by the sheet quality determination unit 92.

The counter control unit 94 controls the counter 88 to count the number of successive abnormal paper sheets if the paper sheet 2 is determined to have poor quality by the sheet quality determination unit 92.

The feed stop unit 95 controls the sheet feed device 4 to stop supply of any more paper sheets 2 to the sheet quality inspection unit 5 (the transport cylinders 18 and 23 of the sheet quality inspection unit 5) when the number of successive abnormal paper sheets counted by the counter 88 has reached a predetermined number, that is, when the sheet quality determination unit 92 determines that a predetermined number of abnormal paper sheets are detected successively. More specifically, the feed stop unit 95 stops gripping of the paper sheet 2 by the swing arm shaft pregripper 12 to stop transport driving of the paper sheet 2 on the feeder board 3 and stop suction of the paper sheet 2 by the suction device.

The cylinder throw-off control unit 96 controls the cylinder throw-on and throw-off devices 61A to 64A and 61B to 64B to throw off the blanket cylinders 37 and 43 of the printing units 31 to 34 when the number of successive abnormal paper sheets counted by the counter 88 has reached a predetermined number, that is, when the sheet quality determination unit 92 determines that a predetermined number of abnormal paper sheets are detected successively.

Note that the first obverse surface inspection camera 20, first reverse surface inspection camera 21, second obverse surface inspection camera 25, and second reverse surface inspection camera 26 constitute an inspection camera unit 27 which captures an image of the paper sheet 2, as shown in FIG. 2. The inspection camera unit 27 is arranged upstream of the offset printing unit 6 in the direction in which the paper sheet 2 is transported, and captures an image of the paper sheet 2 transported by the transport cylinders 18 and 23 of the sheet quality inspection unit 5.

The printing operation of the offset printing press 1 for printing securities will be described next. In the initial state, the first delivery cam 83A is extended to the traveling path of the delivery grippers 79, and the second delivery cam 83B is retracted from the traveling path of the delivery grippers 79.

In this state, the paper sheet 2 fed from the sheet feed device 4 to the feeder board 3 has its leading edge gripped, is transferred from the swing arm shaft pregripper 12 to the transfer cylinder 13, and is further transferred to the gripper device 18c of the transport cylinder 18 of the sheet quality inspection unit 5. The first obverse surface inspection camera 20 captures an image of the obverse surface of the paper sheet 2 held and transported by the gripper device 18c of the transport cylinder 18. The sheet quality determination unit 92 of the control device 90 determines the quality of the obverse surface of the paper sheet 2 based on the image data captured by the first obverse surface inspection camera 20. When the paper sheet 2 is transferred to and held and transported by the gripper device 19c of the transport cylinder 19, the first reverse surface inspection camera 21 captures an image of the reverse surface of the paper sheet 2. The sheet quality determination unit 92 determines the quality of the reverse surface of the paper sheet 2 based on the image data captured by the first reverse surface inspection camera 21.

When the paper sheet 2 is transferred to and held and transported by the gripper device 23c of the transport cylinder 23, the second obverse surface inspection camera 25 captures an image of the obverse surface of the paper sheet 2. The sheet quality determination unit 92 determines the quality of the obverse surface of the paper sheet 2 based on the image data captured by the second obverse surface inspection camera 25. When the paper sheet 2 is transported to and held and transported by the gripper device 24c of the transport cylinder 24, the second reverse surface inspection camera 26 captures an image of the reverse surface of the paper sheet 2. The sheet quality determination unit 92 determines the quality of the reverse surface of the paper sheet 2 based on the image data captured by the second reverse surface inspection camera 26.

If both the obverse and reverse surfaces of the paper sheet 2 are determined to have good quality, the paper sheet 2 is transferred to and transported by the gripper device 36c of the first impression cylinder 36 of the first printing unit 31, and has its obverse surface printed in a first color upon passing through the gap between the first impression cylinder 36 and the first blanket cylinder 37.

The paper sheet 2 is transferred from the first impression cylinder 36 to the gripper device 42c of the second impression cylinder 42, and has its reverse surface printed in the first color upon passing through the gap between the second impression cylinder 42 and second blanket cylinder 43 of the printing unit 31. Then, the second and third printing units 32 and 33 print second and third colors, respectively, on the obverse and reverse surfaces of the paper sheet 2.

The paper sheet 2 is transferred from the second impression cylinder 42 of the third printing unit 33 to the gripper device 36c of the first impression cylinder 36 of the fourth printing unit 34, and has its obverse surface printed in a fourth color upon passing through the gap between the first impression cylinder 36 and the first blanket cylinder 37. While the paper sheet 2 is transported by the first impression cylinder 36, the printing quality obverse surface camera 51 captures an image of the obverse surface of the paper sheet 2. The printing quality determination unit 91 of the control device 90 determines the quality of a print image such as an image pattern printed on the obverse surface of the paper sheet 2, based on the image data captured by the printing quality obverse surface camera 51.

If the obverse surface of the paper sheet 2 is determined to have good printing quality, the paper sheet 2 is transferred from the first impression cylinder 36 to the gripper device 42c of the second impression cylinder 42, and has its reverse surface printed in the fourth color upon passing through the gap between the second impression cylinder 42 and the second blanket cylinder 43. While the paper sheet 2 is transported by the second impression cylinder 42, the printing quality reverse surface camera 52 captures an image of the reverse surface of the paper sheet 2. The printing quality determination unit 91 determines the quality of a print image such as an image pattern printed on the reverse surface of the paper sheet 2, based on the image data captured by the printing quality reverse surface camera 52.

In this manner, the offset printing press 1 for printing securities can simultaneously inspect the print image and quality of the paper sheet 2 using the printing quality obverse surface camera 51, printing quality reverse surface camera 52, sheet quality inspection unit 5, and control device 90.

A paper sheet 2 having its reverse surface determined to have good printing quality is transferred to the delivery grippers 79 via the transfer cylinder 75, is transported as the delivery chains 78 travel, is released from gripping of the delivery grippers 79 by the first delivery cam 83A, and is delivered to the first normal sheet pile 7.

If it is detected based on a signal from the counter 88 that a predetermined number of paper sheets 2 are delivered to the first normal sheet pile 7, the switching control unit 93 of the control device 90 actuates the first delivery cam actuator 84A of the first delivery cam moving device 81A based on the output from the rotary encoder 89 to retract the first delivery cam 83A from the traveling path of the delivery grippers 79. At the same time, the switching control unit 93 actuates the second delivery cam actuator 84B of the second delivery cam moving device 81B to extend the second delivery cam 83B to the traveling path of the delivery grippers 79. Therefore, the next paper sheet 2 passes through the portion below the first delivery cam 83A while continuing to be gripped by the delivery grippers 79, and is released from gripping of the delivery grippers 79 by the second delivery cam 83B, thereby delivering it to the second normal sheet pile 8.

On the other hand, if it is detected based on a signal from the counter 88 that a predetermined number of paper sheets 2 are delivered to the second normal sheet pile 8, the switching control unit 93 performs an operation reverse to the above-mentioned operation. That is, the switching control unit 93 actuates the second delivery cam actuator 84B of the second delivery cam moving device 81B based on the output from the rotary encoder 89 to retract the second delivery cam 83B from the traveling path of the delivery grippers 79. At the same time, the switching control unit 93 actuates the first delivery cam actuator 84A of the first delivery cam moving device 81A to extend the first delivery cam 83A to the traveling path of the delivery grippers 79. Therefore, the next paper sheet 2 is released from gripping of the delivery grippers 79 by the first delivery cam 83A, thereby delivering it to the first normal sheet pile 7.

In this case, if the printing quality determination unit 91 of the control device 90 detects poor printing quality on the obverse surface of the paper sheet 2, the switching control unit 93 of the control device 90 actuates the first delivery cam actuator 84A of the first delivery cam moving device 81A based on the output from the rotary encoder 89 to retract the first delivery cam 83A from the traveling path of the delivery grippers 79, and actuates the second delivery cam actuator 84B of the second delivery cam moving device 81B to retract the second delivery cam 83B from the traveling path of the delivery grippers 79 at the same time. Therefore, the paper sheet 2 which is gripped by the delivery grippers 79 and transported as the delivery chains 78 travel passes through the portions below the first and second delivery cams 83A and 83B, and is released from gripping by the delivery grippers 79 upon engagement of the cam follower of the delivery grippers 79 with the fixing cam 85, thereby delivering it to the abnormal sheet pile 9.

On the other hand, if the printing quality determination unit 91 of the control device 90 detects poor printing quality on the reverse surface of the paper sheet 2, the switching control unit 93 of the control device 90 actuates the first delivery cam actuator 84A of the first delivery cam moving device 81A based on the output from the rotary encoder 89 to retract the first delivery cam 83A from the traveling path of the delivery grippers 79, and actuates the second delivery cam actuator 84B of the second delivery cam moving device 81B to retract the second delivery cam 83B from the traveling path of the delivery grippers 79 at the same time. Therefore, the paper sheet 2 which is gripped by the delivery grippers 79, is transported as the delivery chains 78 travel, and is determined to have poor printing quality passes through the portions below the first and second delivery cams 83A and 83B, and is released from gripping by the delivery grippers 79 upon engagement of the cam follower of the delivery grippers 79 with the fixing cam 85, thereby delivering it to the abnormal sheet pile 9.

Also, if the sheet quality determination unit 92 of the control device 90 detects poor quality of the paper sheet 2 based on the output from at least one of the first obverse surface inspection camera 20 and first reverse surface inspection camera 21 of the first inspection unit 15, and the second obverse surface inspection camera 25 and second reverse surface inspection camera 26 of the second inspection unit 16, the counter control unit 94 of the control device 90 causes the counter 88 to count the number of abnormal paper sheets. More specifically, the counter control unit 94 performs control so that the counter 88 counts up the number of paper sheets 2 if paper sheets 2 with poor quality have been fed successively, and the counter 88 is reset if no paper sheets 2 with poor quality have been fed. That is, the counter control unit 94 controls the counter 88 to count the number of successive paper sheets 2 with poor quality.

If the number of successive abnormal paper sheets counted by the counter 88 is smaller than a preset number, the switching control unit 93 of the control device 90 actuates the first delivery cam actuator 84A of the first delivery cam moving device 81A based on the output from the rotary encoder 89 to retract the first delivery cam 83A from the traveling path of the delivery grippers 79. At the same time, the switching control unit 93 actuates the second delivery cam actuator 84B of the second delivery cam moving device 81B to retract the second delivery cam 83B from the traveling path of the delivery grippers 79. Therefore, the paper sheet 2 which is gripped by the delivery grippers 79, is transported as the delivery chains 78 travel, and is determined to have poor quality passes through the portions below the first and second delivery cams 83A and 83B, and is released from gripping by the delivery grippers 79 upon engagement of the cam follower of the delivery grippers 79 with the fixing cam 85, thereby delivering it to the abnormal sheet pile 9. This means that if the number of successive abnormal paper sheets is smaller than a preset number, the offset printing unit 6 performs offset printing on the abnormal paper sheets without stopping the printing press 1, and delivers the abnormal paper sheets to the abnormal sheet pile 9.

In this manner, a paper sheet 2 determined to have poor quality is delivered to the abnormal sheet pile 9 in place of the normal sheet pile 7 or 8, so not only paper sheets with poor offset printing quality but also those with poor quality are distinguished from normal paper sheets, thus improving the quality of a product. Also, the sheet quality is inspected by an in-line process, so the operator need not carry all paper sheets printed and delivered to the delivery piles from the printing press to a room for inspection and inspect them by visual inspection or using an inspection device in the inspection room. This stabilizes the quality determination criterion in inspection, obviates the need for a special operator dedicated to inspection, relieves the operator's burden, and improves the productivity.

Further, the quality inspection unit 5 including the inspection cameras 20, 21, 25, and 26 and transport cylinders 18 and 23 is provided upstream of the offset printing unit 6 in the direction in which the paper sheet 2 is transported, thereby inspecting the quality of the paper sheet 2 before printing a print image on it. This prevents the print image from hindering quality inspection of the paper sheet 2, thus improving the inspection accuracy.

On the other hand, if it is determined based on the count result obtained by the counter 88 that a preset number of abnormal paper sheets are detected successively, the feed stop unit 95 of the control device 90 deactivates the swing arm shaft pregripper 12 to stop transport of the paper sheet 2 on the feeder board 3, and stops supply of air that serves to draw the paper sheet 2 to the suction device of the sheet feed device 4 by suction. This stops supply of any more paper sheets 2 to the sheet quality inspection unit 5 and, eventually, to the offset printing unit 6, thus making it possible to minimize the number of waste paper sheets having undergone offset printing wastefully.

At the same time, the switching control unit 93 of the control device 90 actuates the first delivery cam actuator 84A of the first delivery cam moving device 81A based on the output from the rotary encoder 89 to retract the first delivery cam 83A from the traveling path of the delivery grippers 79, and actuates the second delivery cam actuator 84B of the second delivery cam moving device 81B to retract the second delivery cam 83B from the traveling path of the delivery grippers 79. Therefore, the paper sheet 2 which is gripped by the delivery grippers 79, is transported as the delivery chains 78 travel, and is determined to have poor quality passes through the portions below the first and second delivery cams 83A and 83B, and is released from gripping by the delivery grippers 79 upon engagement of the cam follower of the delivery grippers 79 with the fixing cam 85, thereby delivering it to the abnormal sheet pile 9. In this manner, a paper sheet 2 determined to have poor quality is delivered to the abnormal sheet pile 9, so the operator need not separate abnormal paper sheets. This relieves the operator's burden and improves the productivity.

Again, if a preset number of abnormal paper sheets are detected successively, the cylinder throw-off control unit 96 of the control device 90 actuates the first to fourth printing unit cylinder throw-on and throw-off devices 61A to 64A and 61B to 64B based on the output from the rotary encoder 89 to throw off the first blanket cylinders 37 and second blanket cylinders 43 of the first to fourth printing units 31 to 34 in turn from the upstream side in the direction in which the paper sheet 2 is transported. Therefore, a paper sheet 2 determined to have poor quality is not printed by the offset printing unit 6, thus making it possible to prevent wasteful printing. Note that this throw-off control is done based on the output from the rotary encoder 89 in the phase in which the first and second blanket cylinders 37 and 43 of the printing units 31 to 34 are not printing, that is, the timing at which the notches in the first and second blanket cylinders 37 and 43 are opposed to those in the first and second impression cylinders 36 and 42, respectively.

In this case, in this embodiment, if it is determined based on the quality inspection result of the paper sheet 2 that paper sheets 2 with poor quality smaller in number than the preset number are detected successively, the first blanket cylinders 37 and second blanket cylinders 43 of the first to fourth printing units 31 to 34 are not thrown off. This is because cylinder throw-off for a paper sheet with poor quality, and throw-on for a normal paper sheet next to the paper sheet with poor quality cannot be done in time, and thus are practically impossible.

A method of stopping feed of the paper sheet 2 from the sheet feed device 4 every time it is determined based on the quality inspection result of the paper sheet 2 that a paper sheet 2 with poor quality has been fed is available. However, because the productivity lowers when feed of the paper sheet 2 is stopped every time one paper sheet 2 with poor quality has been fed, this method is impractical. As in this embodiment, if a plurality of paper sheets with poor quality have been fed successively, feed of the paper sheet 2 from the sheet feed device 4 is canceled, and the first blanket cylinders 37 and second blanket cylinders 43 of the first to fourth printing units 31 to 34 are thrown off the corresponding first impression cylinders 36 and second impression cylinders 42, thereby making it possible to minimize the printing cost without lowering the productivity.

Second Embodiment

The second embodiment of the present invention will be described next with reference to FIGS. 6 to 8. In these drawings, the same reference numerals denote the same or equivalent members as or to the members described in the first embodiment shown in FIGS. 1 to 4, and a detailed description thereof will not be given as needed.

Figure 6:
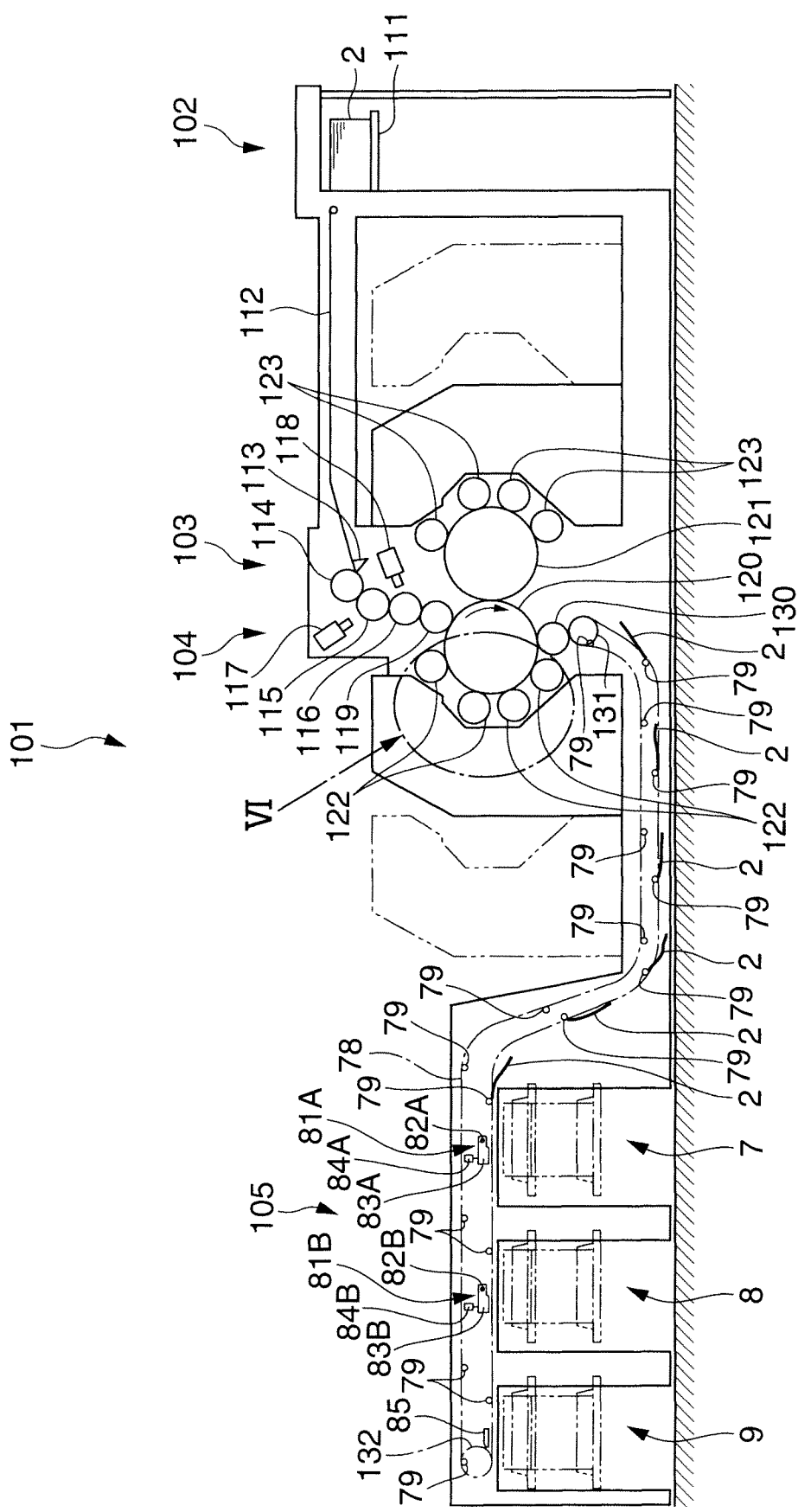
FIG. 6 is a side view showing an offset printing press for printing securities according to the second embodiment of the present invention.

An offset printing press 101 for printing securities shown in FIG. 6 includes a sheet feed device 102, sheet quality inspection unit 103, offset printing unit 104, and sheet delivery device 105. The sheet feed device 102 serves as a sheet supply device which feeds paper sheets 2 to a feeder board 112 one by one. The sheet quality inspection unit 103 is used to inspect the qualities of the fed paper sheets 2. The offset printing unit 104 is positioned downstream of the sheet quality inspection unit 103 in the direction in which the paper sheet 2 is transported, and prints print images of ground tint patterns on the paper sheets 2. The sheet delivery device 105 transports the paper sheets 2 having the print images printed on them by the offset printing unit 104, and delivers them to first and second normal sheet piles 7 and 8 or an abnormal sheet pile 9.

The sheet feed device 102 is provided with a pile board 111 which stacks a large number of paper sheets 2 having their obverse and reverse surfaces processed by anticounterfeit techniques. The paper sheets 2 stacked on the pile board 11 are drawn by suction one by one by a suction device (not shown), are fed to the feeder board 112, and are further fed to the sheet quality inspection unit 103 via a transfer cylinder 114 by a swing arm shaft pregripper 113 after their leading edges are aligned.

The sheet quality inspection unit 103 includes transport cylinders 115 and 116, an obverse surface inspection camera 117, and a reverse surface inspection camera 118. The transport cylinders 115 and 116 sequentially hold and transport the paper sheets 2 transferred from the transfer cylinder 114. The obverse surface inspection camera 117 captures an image of the obverse surface of the paper sheet 2 transported by the transport cylinder 115. The reverse surface inspection camera 118 captures an image of the reverse surface of the paper sheet 2 transported by the transport cylinder 116.

Each of the obverse surface inspection camera 117 and reverse surface inspection camera 118 uses an infrared absorption image and color image inspection camera which captures an infrared absorption image and color image formed on the paper sheet 2, and an ultraviolet camera which inspects an ultraviolet image formed on the paper sheet 2. The infrared absorption image and color image inspection camera is used to capture images of a "watermark", "hologram", "pearl print", and "security wire" embedded in the paper sheet 2. The ultraviolet camera is used to capture an image of a "security fiber" embedded in the paper sheet 2.

The transport cylinders 115 and 116 are configured similarly to the transport cylinders 18 and 19, respectively, in the first embodiment, and include gripper devices 115c and 116c, respectively, which serve as sheet holding devices and have the same arrangement as the gripper device 18c of the transport cylinder 18. The transport cylinders 115 and 116 bring the paper sheet 2 held and transported by the gripper devices 115c and 116c, respectively, into tight contact with their circumferential surfaces to improve the accuracy of quality inspection of the paper sheet 2 by the obverse surface inspection camera 117 and reverse surface inspection camera 118.

The offset printing unit 104 includes a first blanket cylinder 120 and second blanket cylinder 121. The first blanket cylinder 120 holds and transports the paper sheet 2. The second blanket cylinder 121 is opposed to the first blanket cylinder 120. The second blanket cylinder 121 is in contact with the first blanket cylinder 120 on the downstream side of a transfer cylinder 119 on the first blanket cylinder 120. That is, the position at which the second blanket cylinder 121 is in contact with the first blanket cylinder 120 is downstream of that at which the transfer cylinder 119 is in contact with the first blanket cylinder 120.

A gripper device 120c serving as a sheet holding device which holds and transports the paper sheet 2 transferred from the transport cylinder 116 via the transfer cylinder 119 is provided in the notch of the first blanket cylinder 120. The gripper device 120c has the same arrangement as the gripper device 18c of the transport cylinder 18 in the first embodiment.

Four first plate cylinders 122 are in contact with the first blanket cylinder 120 on the upstream side of the transfer cylinder 119 on the first blanket cylinder 120. That is, the positions at which the first plate cylinders 122 are in contact with the first blanket cylinder 120 are upstream of that at which the transfer cylinder 119 is in contact with the first blanket cylinder 120. The first plate cylinders 122 are arranged with predetermined spacings between them in the circumferential direction of the first blanket cylinder 120. The four first plate cylinders 122 transfer ink onto the circumferential surface of the first blanket cylinder 120 (its circumferential surface opposed to the paper sheet 2).

Four second plate cylinders 123 are in contact with the first blanket cylinder 120 on the upstream side of the first blanket cylinder 120 on the second blanket cylinder 121. That is, the positions at which the second plate cylinders 123 are in contact with the second blanket cylinder 121 are upstream of that at which the first blanket cylinder 120 is in contact with the second blanket cylinder 121. The second plate cylinders 123 are arranged with predetermined spacings between them in the circumferential direction of the second blanket cylinder 121. The four second plate cylinders 123 transfer ink onto the circumferential surface of the second blanket cylinder 121.

Figure 7:
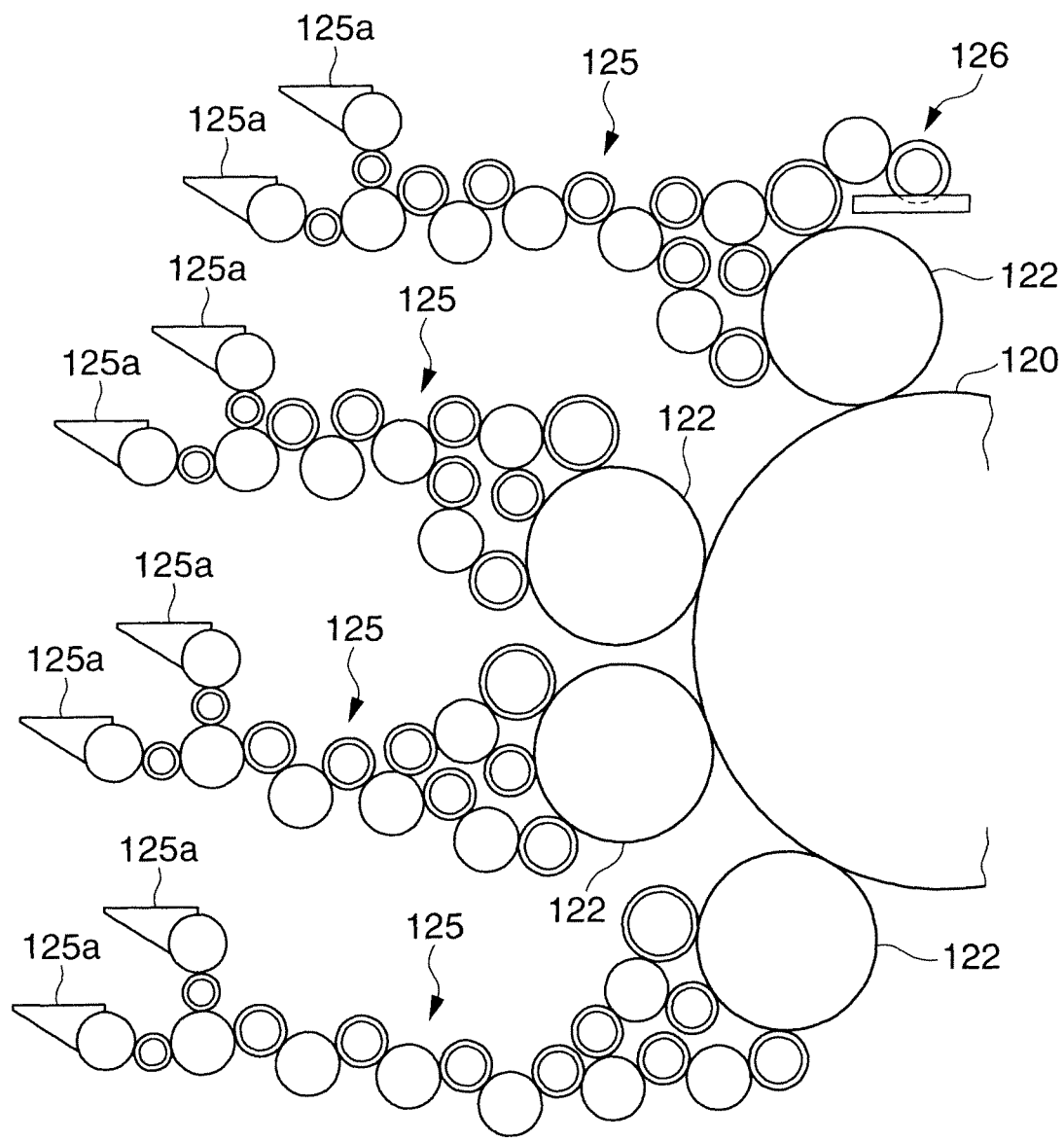
FIG. 7 is an enlarged view showing a portion VI in FIG. 6.

Each of the first plate cylinders 122 and second plate cylinders 123 is provided with a double duct ink supply device 125 and dampening device 126 (neither the ink supply device 125 nor dampening device 126 of the second plate cylinders 123 is shown), as shown in FIG. 7. The ink supply device 125 includes two ink fountains 125a which serve to supply ink. The dampening device 126 supplies dampening water. With such an arrangement, the paper sheet 2 held and transported by the gripper device 120c of the first blanket cylinder 120 has its two surfaces printed upon passing through the gap between the first blanket cylinder 120 and the second blanket cylinder 121.

The first plate cylinders 122 are provided with first cylinder throw-on and throw-off devices 128 which throw them on and off the first blanket cylinder 120. The second plate cylinders 123 are provided with second cylinder throw-on and throw-off devices 129 which throw them on and off the second blanket cylinder 121 (see FIG. 8). The first and second cylinder throw-on and throw-off devices 128 and 129 have the same arrangement as the first to fourth printing unit cylinder throw-on and throw-off devices 61A to 64A and 61B to 64B.

Referring to FIG. 6, a transfer cylinder 130 is in contact with the first blanket cylinder 120 on the downstream side of the second blanket cylinder 121 on the first blanket cylinder 120. A delivery cylinder 131 is in contact with the transfer cylinder 130. A pair of delivery chains 78 are looped around a sprocket (not shown) coaxial with the delivery cylinder 131 and a sprocket 132 provided at the terminal end of the sheet delivery device 105.

Delivery grippers 79 are provided between the pair of delivery chains 78, as in the first embodiment. The delivery grippers 79 receive the paper sheet 2, gripped by the gripper device of the transfer cylinder 130, in cooperation with the delivery cylinder 131, and transport it to the sheet delivery device 105 as the delivery chains 78 travel.

First and second delivery cam moving devices 81A and 81B serving as switching devices are provided above the first and second normal sheet piles 7 and 8, and a fixing cam 85 is provided above the abnormal sheet pile 9, as in the first embodiment.

Figure 8:
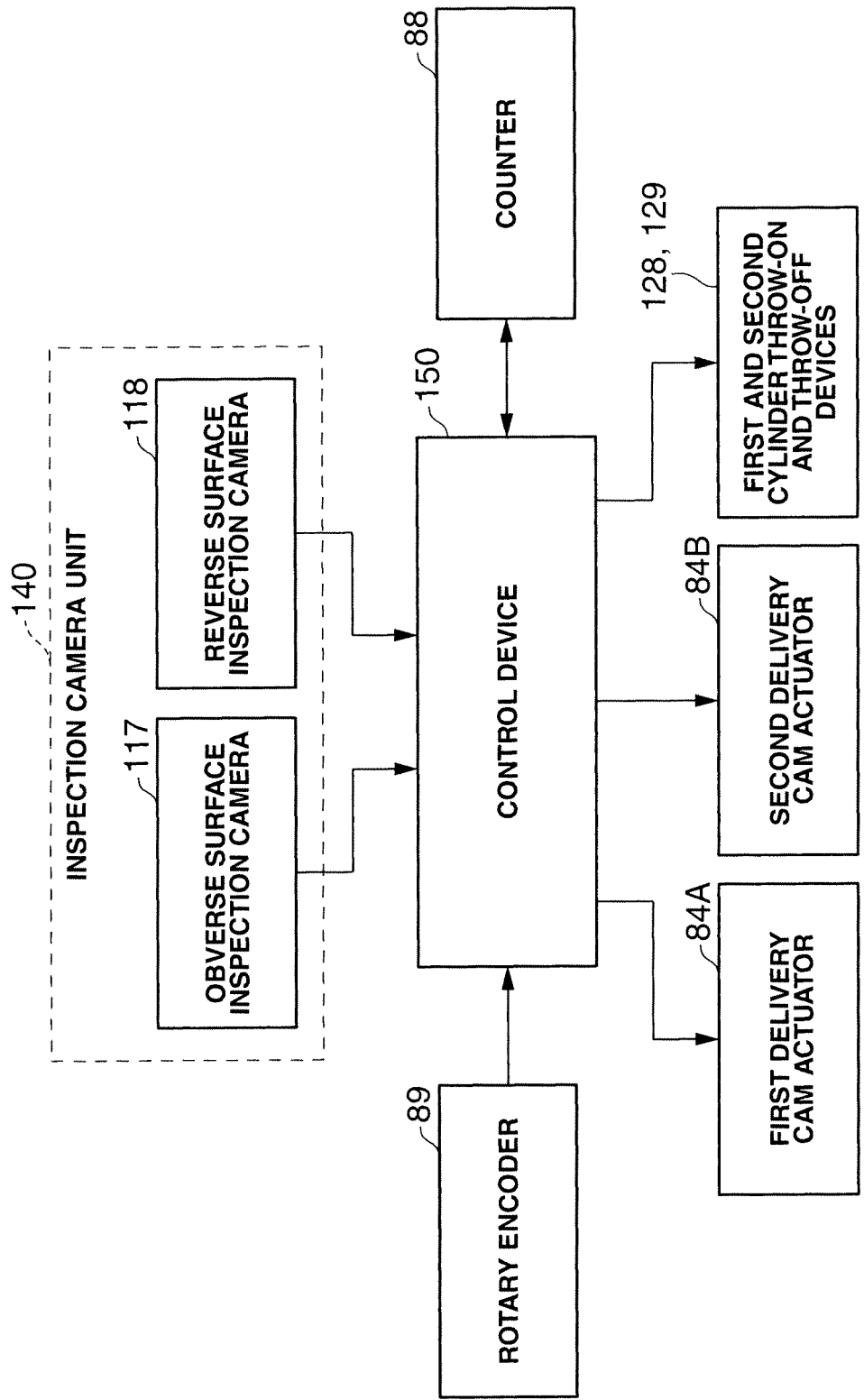
FIG. 8 is a block diagram showing the arrangement of the printing press shown in FIG. 6.

The offset printing press 101 for printing securities also includes a counter 88, rotary encoder 89, and control device 150, as shown in FIG. 8. The control device 150 uses a computer (CPU or MPU), processes a signal (data) output from each unit of the printing press 101, and controls this unit of the printing press 101 based on the processing result.

Figure 9:
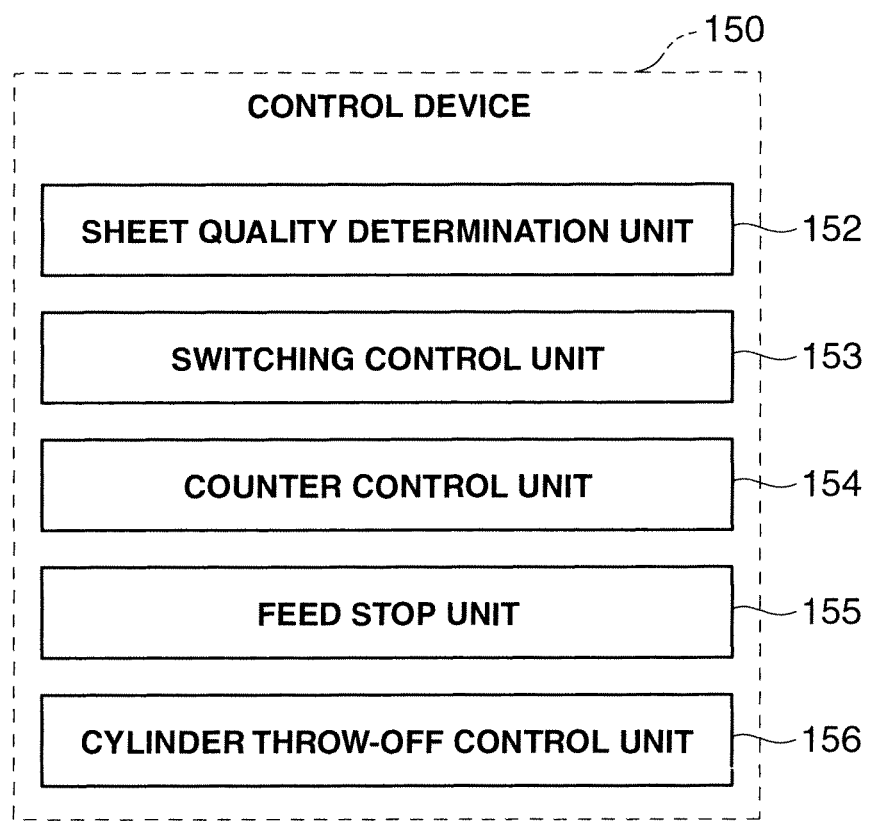
FIG. 9 is a block diagram showing functional units of a control device shown in FIG. 8.

The control device 150 implements at least functional units 152 to 156, as shown in FIG. 9. The sheet quality determination unit 152, switching control unit 153, counter control unit 154, feed stop unit 155, and cylinder throw-off control unit 156 have the same functions as the sheet quality determination unit 92, switching control unit 93, counter control unit 94, feed stop unit 95, and cylinder throw-off control unit 96, respectively, in the first embodiment.

However, the sheet quality determination unit 152 is different from the sheet quality determination unit 92 in that the former determines the quality of the paper sheet 2 based on image data output from the obverse surface inspection camera 117 and reverse surface inspection camera 118. Also, since the printing quality is not determined in this embodiment, the switching control unit 153 does not perform delivery destination switching control based on the printing quality determination result. Moreover, the feed stop unit 155 controls the sheet feed device 102. Again, the cylinder throw-off control unit 156 controls the first and second cylinder throw-on and throw-off devices 128 and 129.

Note that the obverse surface inspection camera 117 and reverse surface inspection camera 118 constitute an inspection camera unit 140 which captures an image of the paper sheet 2, as shown in FIG. 8. The inspection camera unit 140 is arranged upstream of the offset printing unit 104 in the direction in which the paper sheet 2 is transported, and captures an image of the paper sheet 2 transported by the transport cylinders 115 and 116 of the sheet quality inspection unit 103.

The printing operation of the offset printing press 101 for printing securities will be described next. In the initial state, a first delivery cam 83A is extended to the traveling path of the delivery grippers 79, and a second delivery cam 83B is retracted from the traveling path of the delivery grippers 79. In this state, the paper sheet 2 fed from the sheet feed device 102 to the feeder board 112 has its leading edge gripped, is transferred from the swing arm shaft pregripper 113 to the transfer cylinder 114, and is further transferred to the gripper device 115c of the transport cylinder 115 of the sheet quality inspection unit 103.

The obverse surface inspection camera 117 captures an image of the obverse surface of the paper sheet 2 held and transported by the gripper device 115c of the transport cylinder 115. The sheet quality determination unit 152 of the control device 150 determines the quality of the obverse surface of the paper sheet 2 based on the image data captured by the obverse surface inspection camera 117. When the paper sheet 2 is transferred to and held and transported by the gripper device 116c of the transport cylinder 116, the reverse surface inspection camera 118 captures an image of the reverse surface of the paper sheet 2. The sheet quality determination unit 152 determines the quality of the reverse surface of the paper sheet 2 based on the image data captured by the reverse surface inspection camera 118.

If both the obverse and reverse surfaces of the paper sheet 2 are determined to have good quality, the paper sheet 2 is transferred to the gripper device 120c of the first blanket cylinder 120 via the transfer cylinder 119. The paper sheet 2 held and transported by the gripper device 120c of the first blanket cylinder 120 has its two, obverse and reverse surfaces each printed in four colors upon passing through the gap between the first blanket cylinder 120 and the second blanket cylinder 121. The paper sheet 2 printed on its two, obverse and reverse surfaces is transferred to the delivery grippers 79 via the transfer cylinder 130, is transported as the delivery chains 78 travel, is released from gripping of the delivery grippers 79 by the first delivery cam 83A, and is delivered to the first normal sheet pile 7.

If it is detected based on a signal from the counter 88 that a predetermined number of paper sheets 2 are delivered to the first normal sheet pile 7, the switching control unit 153 of the control device 150 actuates a first delivery cam actuator 84A of the first delivery cam moving device 81A based on the output from the rotary encoder 89 to retract the first delivery cam 83A from the traveling path of the delivery grippers 79. At the same time, the switching control unit 153 actuates a second delivery cam actuator 84B of the second delivery cam moving device 81B to extend the second delivery cam 83B to the traveling path of the delivery grippers 79. Therefore, the next paper sheet 2 passes through the portion below the first delivery cam 83A while continuing to be gripped by the delivery grippers 79, and is released from gripping of the delivery grippers 79 by the second delivery cam 83B, thereby delivering it to the second normal sheet pile 8.

On the other hand, if it is detected based on a signal from the counter 88 that a predetermined number of paper sheets 2 are delivered to the second normal sheet pile 8, the switching control unit 153 performs an operation reverse to the above-mentioned operation. That is, the switching control unit 153 actuates the second delivery cam actuator 84B of the second delivery cam moving device 81B based on the output from the rotary encoder 89 to retract the second delivery cam 83B from the traveling path of the delivery grippers 79. At the same time, the switching control unit 153 actuates the first delivery cam actuator 84A of the first delivery cam moving device 81A to extend the first delivery cam 83A to the traveling path of the delivery grippers 79. Therefore, the next paper sheet 2 is released from gripping of the delivery grippers 79 by the first delivery cam 83A, thereby delivering it to the first normal sheet pile 7.

In this case, if the sheet quality determination unit 152 of the control device 150 detects poor quality of the paper sheet 2 based on the output from at least one of the obverse surface inspection camera 117 and reverse surface inspection camera 118 of the sheet quality inspection unit 103, the counter control unit 154 of the control device 150 causes the counter 88 to count the number of abnormal paper sheets. More specifically, the counter control unit 154 performs control so that the counter 88 counts up the number of paper sheets 2 if paper sheets 2 with poor quality have been fed successively, and the counter 88 is reset if no paper sheets 2 with poor quality have been fed. That is, the counter control unit 154 controls the counter 88 to count the number of successive paper sheets 2 with poor quality.

If the number of successive abnormal paper sheets counted by the counter 88 is smaller than a preset number, the switching control unit 153 of the control device 150 actuates the first delivery cam actuator 84A of the first delivery cam moving device 81A based on the output from the rotary encoder 89 to retract the first delivery cam 83A from the traveling path of the delivery grippers 79. At the same time, the switching control unit 153 actuates the second delivery cam actuator 84B of the second delivery cam moving device 81B to retract the second delivery cam 83B from the traveling path of the delivery grippers 79. Therefore, the paper sheet 2 which is gripped by the delivery grippers 79, is transported as the delivery chains 78 travel, and is determined to have poor quality passes through the portions below the first and second delivery cams 83A and 83B, and is released from gripping by the delivery grippers 79 upon engagement of the cam follower of the delivery grippers 79 with the fixing cam 85, thereby delivering it to the abnormal sheet pile 9. This means that if the number of successive abnormal paper sheets is smaller than a preset number, the offset printing unit 104 performs offset printing on the abnormal paper sheets without stopping the printing press 101, and delivers the abnormal paper sheets to the abnormal sheet pile 9.

In this manner, a paper sheet 2 determined to have poor quality is delivered to the abnormal sheet pile 9 in place of the normal sheet pile 7 or 8, so not only paper sheets with poor offset printing quality but also those with poor quality are distinguished from normal paper sheets, thus improving the quality of a product. Also, the sheet quality is inspected by an in-line process, so the operator need not carry all paper sheets printed and delivered to the delivery piles from the printing press to a room for inspection and inspect them by visual inspection or using an inspection device in the inspection room. This stabilizes the quality determination criterion in inspection, obviates the need for a special operator dedicated to inspection, relieves the operator's burden, and improves the productivity.

Further, the quality inspection unit 103 including the inspection cameras 117 and 118 and transport cylinders 115 and 116 is provided upstream of the offset printing unit 104 in the direction in which the paper sheet 2 is transported, thereby inspecting the quality of the paper sheet 2 before printing a print image on it. This prevents the print image from hindering quality inspection of the paper sheet 2, thus improving the inspection accuracy.

On the other hand, if it is determined based on the count result obtained by the counter 88 that a preset number of abnormal paper sheets are detected successively, the sheet delivery device 105 of the control device 90 deactivates the swing arm shaft pregripper 113 to stop transport of the paper sheet 2 on the feeder board 112, and stops supply of air that serves to draw the paper sheet 2 to the suction device of the sheet feed device 102 by suction. This stops supply of any more paper sheets 2 to the sheet quality inspection unit 103 and, eventually, to the offset printing unit 104, thus making it possible to minimize the number of waste paper sheets having undergone offset printing wastefully.

At the same time, the switching control unit 153 of the control device 150 actuates the first delivery cam actuator 84A of the first delivery cam moving device 81A based on the output from the rotary encoder 89 to retract the first delivery cam 83A from the traveling path of the delivery grippers 79, and actuates the second delivery cam actuator 84B of the second delivery cam moving device 81B to retract the second delivery cam 83B from the traveling path of the delivery grippers 79. Therefore, the paper sheet 2 which is gripped by the delivery grippers 79, is transported as the delivery chains 78 travel, and is determined to have poor quality passes through the portions below the first and second delivery cams 83A and 83B, and is released from gripping by the delivery grippers 79 upon engagement of the cam follower of the delivery grippers 79 with the fixing cam 85, thereby delivering it to the abnormal sheet pile 9. In this manner, a paper sheet 2 determined to have poor quality is delivered to the abnormal sheet pile 9, so the operator need not separate abnormal paper sheets. This relieves the operator's burden and improves the productivity.

If a preset number of abnormal paper sheets are detected successively, the cylinder throw-off control unit 156 of the control device 150 actuates the first and second cylinder throw-on and throw-off devices 128 and 129 based on the output from the rotary encoder 89 to throw off the first plate cylinders 122 in turn from the upstream side in the direction in which the first blanket cylinder 120 rotates, and throw off the second plate cylinders 123 in turn from the upstream side in the direction in which the second blanket cylinder 121 rotates. Therefore, a paper sheet 2 determined to have poor quality is not printed by the offset printing unit 104, thus making it possible to prevent wasteful printing. Note that this throw-off control is done based on the output from the rotary encoder 89 in the phase in which the first and second plate cylinders 122 and 123 are not printing, that is, the timing at which the notches in the first and second plate cylinders 122 and 123 are opposed to those in the first blanket cylinder 120 and second blanket cylinder 121, respectively.

Note that an example in which a camera which captures an infrared absorption image and color image is used as each of the first inspection cameras 20 and 21, and an ultraviolet camera is used as each of the second inspection cameras 25 and 26 has been given in the first embodiment. However, a camera which captures an infrared absorption image and color image, an infrared camera which captures an infrared absorption image such as a "watermark", a color camera which captures color images such as a "hologram" and "pearl print", or an ultraviolet camera may be appropriately selected in accordance with the type of anticounterfeit means to be inspected. Also, since the inspection units 15 and 16 are modularized, it is possible to provide the same number of inspection units as the types of cameras, and inspect an arbitrary type by one web threading operation.

Note also that an example in which a camera which captures an infrared absorption image and color image and an ultraviolet camera are used has been given in the second embodiment. However, a camera which captures an infrared absorption image and color image, an infrared camera, a color camera, or an ultraviolet camera may be appropriately selected in accordance with the type of anticounterfeit means to be inspected.

As described above, according to the above-mentioned embodiments, the printing press includes the sheet quality inspection unit 5 or 103, and this relieves the operator's burden and improves the productivity. Also, the quality of the paper sheet 2 is inspected before printing a print image on it, and this prevents the print image from hindering quality inspection of the paper sheet 2, thus improving the inspection accuracy.

Moreover, a paper sheet 2 determined to have poor quality is delivered to the abnormal sheet pile 9, so the operator need not separate abnormal paper sheets. This relieves the operator's burden and improves the productivity.

Again, feed of the paper sheet 2 is stopped when a plurality of abnormal paper sheets are detected successively, thereby minimizing the number of waste sheets.

What is claimed is:

1. An offset printing press for printing securities, comprising:
    an offset printing unit which prints, by an offset printing, a ground tint pattern on a transported paper sheet which includes an anticounterfeit means before being introduced to the offset printing press;
    an inspection camera unit which is arranged upstream of said offset printing unit in a direction in which the paper sheet is transported, and captures an image of the paper sheet before the ground tint pattern is printed; and
    a sheet quality determination unit which determines a quality of the paper sheet on which no ground tint pattern is printed by inspecting a quality of the anticounterfeit means based on image data output from said inspection camera unit,
    a printing quality camera which is arranged downstream of said offset printing unit in the direction in which the paper sheet is transported, and captures an image of the paper sheet on which the ground tint pattern is printed by said offset printing unit; and
    a printing quality determination unit which determines a printing quality of the ground tint pattern on the paper sheet based on image data output from said printing quality camera.

2. A press according to claim 1, wherein said inspection camera unit includes at least one of an infrared absorption image and color image inspection camera which captures an infrared absorption image and color image formed on the paper sheet, an infrared camera which captures an infrared absorption image formed on the paper sheet, a color camera which captures a color image formed on the paper sheet, and an ultraviolet camera which captures an ultraviolet image formed on the paper sheet.

3. A press according to claim 1, wherein said inspection camera unit includes
    a first inspection camera which captures an infrared absorption image and color image formed on the paper sheet, and
    a second inspection camera which captures an ultraviolet image formed on the paper sheet.

4. A press according to claim 1, further comprising:
- a sheet delivery device including a normal sheet pile to which a normal paper sheet is delivered, and an abnormal sheet pile to which an abnormal paper sheet is delivered;
- a switching device which switches a delivery destination of the paper sheet between said normal sheet pile and said abnormal sheet pile; and
- a switching control unit which controls said switching device to deliver the paper sheet determined to have poor quality by said sheet quality determination unit to said abnormal sheet pile.

5. A press according to claim 1, further comprising a transport cylinder which is arranged upstream of said offset printing unit in the direction in which the paper sheet is transported, and includes a sheet holding device which holds the paper sheet,
- wherein said inspection camera unit captures an image of the paper sheet transported by said transport cylinder.

6. A press according to claim 5, further comprising:
- a sheet supply device which supplies the paper sheet onto said transport cylinder; and
- a feed stop unit which controls said sheet supply device to stop supply of any more paper sheets when said sheet quality determination unit determines that a predetermined number of abnormal paper sheets are detected successively.

7. A press according to claim 1, wherein said offset printing unit includes
- a one-side printing unit which prints on one surface of the paper sheet, and includes a first impression cylinder including a sheet holding device holding the paper sheet, and a first blanket cylinder which is in contact with said first impression cylinder and onto which ink is transferred from a first plate cylinder, and
- a the-other-side printing unit which prints on the other surface of the paper sheet, and includes a second impression cylinder which includes a sheet holding device holding the paper sheet, is opposed to said first impression cylinder, and receives the paper sheet from said first impression cylinder, and a second blanket cylinder which is in contact with said second impression cylinder and onto which ink is transferred from a second plate cylinder.

8. A press according to claim 7, further comprising:
- cylinder throw-on and throw-off devices which throw said first blanket cylinder on and off said first impression cylinder, and throw said second blanket cylinder on and off said second impression cylinder; and
- a cylinder throw-off control unit which controls said cylinder throw-on and throw-off devices to throw off said first blanket cylinder and said second blanket cylinder when said sheet quality determination unit determines that a predetermined number of abnormal paper sheets are detected successively.

9. A press according to claim 1, wherein
said offset printing unit includes
- a first blanket cylinder which includes a sheet holding device holding and transporting the paper sheet, and has a circumferential surface which is opposed to the paper sheet and onto which ink is transferred from a first plate cylinder, and
- a second blanket cylinder which is opposed to said first blanket cylinder and onto which ink is transferred from a second plate cylinder, and
- two surfaces of the paper sheet are printed when the paper sheet passes through a gap between said first blanket cylinder and said second blanket cylinder.

10. A press according to claim 9, further comprising:
- a first cylinder throw-on and throw-off device which throw said first plate cylinder on and off said first blanket cylinder;
- a second cylinder throw-on and throw-off device which throw said second plate cylinder on and off said second blanket cylinder; and
- a cylinder throw-off control unit which controls said first and second cylinder throw-on and throw-off devices to throw off said first and second plate cylinders when said sheet quality determination unit determines that a predetermined number of abnormal paper sheets are detected successively.

\* \* \* \* \*